Sept. 22, 1959 D. H. CRONQUIST 2,905,768

AIR HEAD

Filed Sept. 24, 1954

INVENTOR.
DONALD H. CRONQUIST

BY

John B. Aponsler

AGENT

United States Patent Office 2,905,768

Patented Sept. 22, 1959

2,905,768

AIR HEAD

Donald H. Cronquist, San Jose, Calif., assignor to International Business Machines Corporation, New York, N.Y., a corporation of New York Application September 24, 1954, Serial No. 458,078

1 Claim. (Cl. 179—100.2)

The present invention relates to magnetic recording heads, and more specifically to air stabilized magnetic recording heads.

In electrostatic and magnetic recording arts it is desirable to maintain recording heads at a constant distance from a recording surface. Normally, this distance must also be exceedingly small. It is, accordingly, an object of this invention to provide an air stabilized head for obtaining extremely fine increments of recording head spacing.

Another object is to provide an air head in which the space between the air head and the recording surface may be adjusted and maintained through the control of air pressure supplying the head.

A further object is to provide a more sensitive air head for maintaining the recording element a predetermined distance from the recording surface regardless of deformities or irregularities therein.

A still further object is to provide an air head together with an external device for withdrawing air between the head and recording surface.

Another object is to provide an air head having increased stability.

Other objects of the invention will be pointed out in the following description and claim and illustrated in the accompanying drawings, which disclose, by way of example, the principle of the invention and the best mode which has been contemplated of applying that principle.

Figure 1:
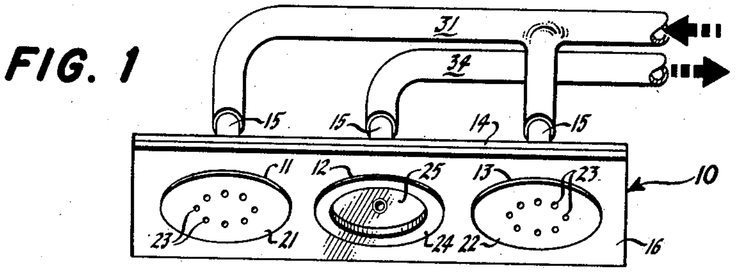
Fig. 1 is a perspective view of one form of the novel recording head.
Figures 2, 3, 4, 5, 6:
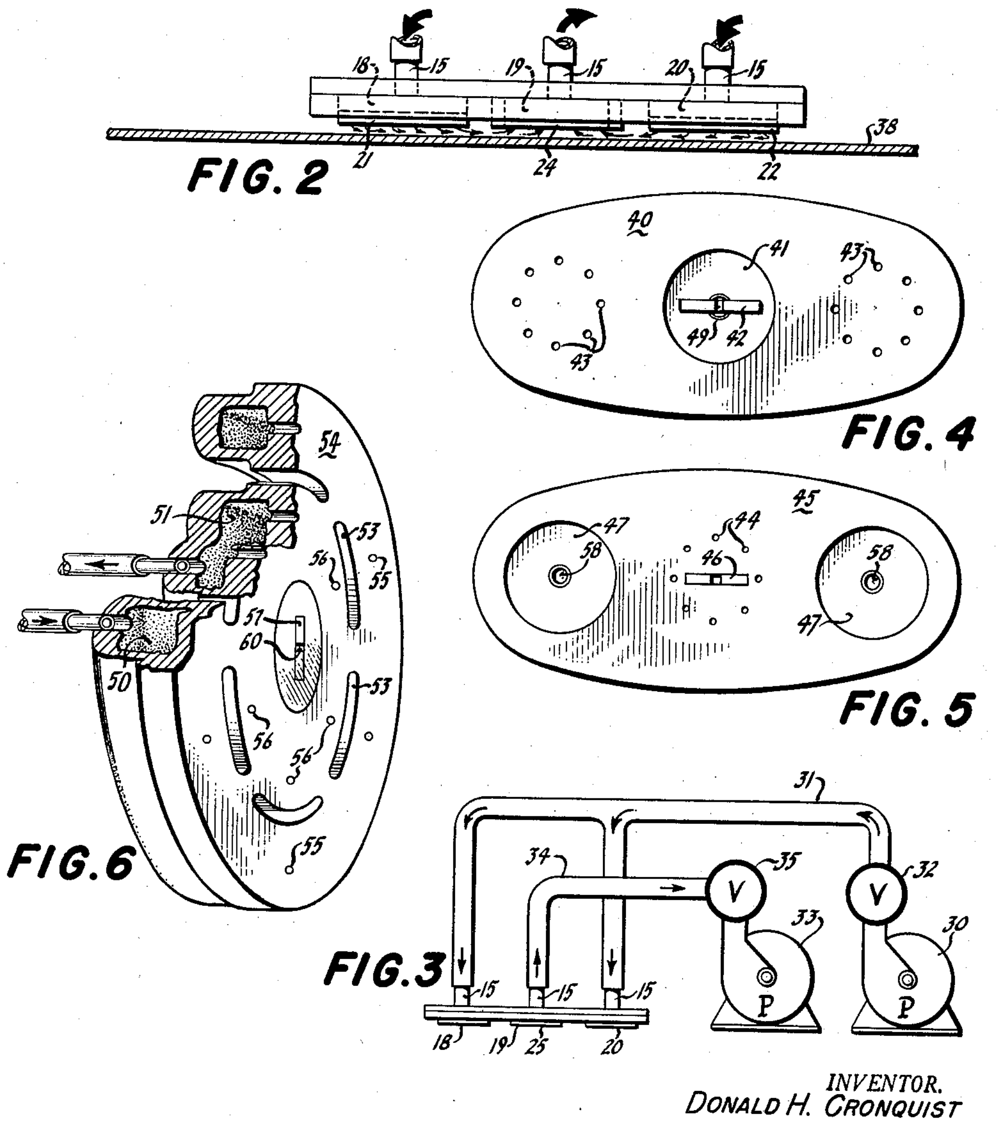
Fig. 2 is a sectional view of Fig. 1 showing details of the air passages.
Fig. 3 is a schematic view showing details of the air supply for the recording head of Fig. 1.
Fig. 4 is a plan view of a modification of the recording head of Fig. 1.
Fig. 5 is a plan view of a further modification.
Fig. 6 is a sectional view of still another form of the novel recording head.

In Figs. 1 and 2 an air head is provided with a body 10 having three cylinders 11, 12 and 13 arranged linearly between the top of the body 10 and a face 16. A cover plate 14 is affixed across the top of the body 10 to cover one end of the three cylinders 11, 12 and 13. A conduit 15 is attached to the cover plate 14 adjacent each cylinder so as to provide three manifolds 18, 19 and 20 defined by the cavities within the cylinders 11, 12 and 13 and the cover plate 14. Each manifold opens from the face 16 through its conduit 15 on the cover plate 14. A face plate 21 is fitted over the cylinder 11 on the face 16, and a similar face plate 22 is fitted over the cylinder 13 on the face 16. The face plates 21 and 22 are each provided with a radius of eight holes 23, which are orifices to port air out of the manifolds 18 and 20. A ring 24 is attached to the face 16, adjacent the cylinder 12, which has an open inside diameter sufficient to provide an air withdrawal cup 25 formed by the cavity of manifold 19. Plates 21 and 22 and ring 24 are arranged to protrude from the surface of face 16 an equal distance so that the two plates 21 and 22 and the ring 24 are parallel with each other.

In Fig. 3 an air pump 30 is arranged to supply air at a pressure considerably greater than atmospheric through a hose 31 and an adjustable control valve 32 to the two conduits 15 leading into manifolds 18 and 20. A pump 33 is arranged to withdraw air at a pressure considerably below atmospheric from the cup 25 through the conduit 15 leading out of manifold 19 and hose 34. An adjustable control valve 35 is in series with the hose 34 to control the flow of air to the pump 33 from the cup 25. It is apparent that a common pump could be used to both withdraw air and supply air as required.

The air head body 10 is arranged so that the face will ride substantially parallel to a recording surface 38 so that face plates 21 and 22 and ring 24 are intimate thereto. Air, flowing through the holes 23 and from the manifolds 18 and 20, results in a series of air streams which flow against the recording surface 38. This air stream causes a thin film of air to exist between the body 10 and the recording surface 38, which tends to space the recording head from the recording surface 38, thus acting as an air bearing. However, a further feature of the invention is the provision of the air withdrawal cup 25 whereby a portion of the air flowing under pressure from the holes 23 is drawn from the space between the plates 21 and 22 and the surface 38 so that the distance that the head is supported from the recording head is substantially lessened, and the stability of the head in maintaining a constant distance from the recording surface is increased.

In previously known air heads, it has been found that changes and adjustments in the distance the head was spaced from the recording surface could not be effectively acquired without either changing the dimension of the head itself, or by the use of a mechanical biasing means, such as preloading springs and the like.

In the subject head an adjustment in the distance between the head and the recording surface, within appreciably wide limits, is possible solely by varying the amount of air being forced against the recording surface 38 from the holes 23 through control valve 32, or by varying the amount of air withdrawn from the recording surface 38 through adjustments of control valve 35. An increase in the amount of air being applied from holes 23 will cause the head to be spaced farther from the surface 38, while an increase in the amount of air being withdrawn will cause the head to be spaced closer to the recording surface 38.

A more practical form of the invention is illustrated in Fig. 4 in which an air head having a substantially flat, elliptically shaped face 40 is provided with an exhaust cavity 41 extending inwardly from the center of the face 40 into the body of the air head. A magnetic recording head 42 is mounted in the exhaust cavity 41 so that the tip of the recording element is flush with the outer surface of the face 40. On either side of the cavity 41 is a radius of air outlets 43. The outlets 43 are supplied with air from a manifold in the head behind the outlets. This manifold is supplied by air from a pump 30 as shown in Fig. 3 so as to exhaust air from the outlets 43 onto any recording surface with which the head coacts. A tube 49 is provided to the air exhaust cavity 41, which is connected to a vacuum pump, as shown in connection with the pump 33 of Fig. 3, to withdraw air from between the head and the recording surface.

A variation of the head of Fig. 4 is shown in Fig. 5 in which a head is provided having a circle of air outlets 44 located in the center portion of its face 45. A magnetic recording element 46 is countersunk in the face 45 in the center of the radius of outlets 44. A manifold in the head behind the outlets 44 is supplied with air pressure which is exhausted from the outlets 44. On either side of the recording element there is an air exhaust cup 47 which is attached to a vacuum pump through a conduit 58. The head is thereby supported by air forced from the outlets 44 onto a recording surface and is biased toward the surface by air withdrawn through cups 47.

Another embodiment of the invention is shown in Fig. 6 wherein a disc-shaped head is provided having an intake manifold 50 and an exhaust manifold 51. The intake manifold 50 is arranged radially to the exhaust manifold 51 which occupies the center portion of the disc. A face of the head 54 is provided with orifices 55 leading to the intake manifold 50, and orifices 56 leading to the exhaust manifold 51. Static air vents 53 are arranged radially through the head between the intake and the exhaust manifolds which open onto the face 54. A recording element 57 is located in the center of the face 54 and countersunk therein so that its recording gap 60 is flush therewith. The intake manifold 50 is supplied with high pressure air, while the exhaust manifold 51 is connected to a vacuum. When the face 54 is arranged to coact with a recording surface, air forced from the orifices 55 forces the head above its coacting recording surface. A low pressure area is created under the center area of the disc because of air being withdrawn through the orifices 56. This causes atmospheric pressure to force the disc against the recording surface. The static air vents 53 isolate the exhaust area in the center of the surface 54 and the higher pressure area on the periphery of the surface 54 so that each may function more independently of the other. The pressure from the exhaust manifold 51 and to the intake manifold 50 is adjusted to hold the head in equilibrium as discussed above.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A transducer arrangement adapted to coact with a magnetic recording surface comprising a body member having substantially parallel top and bottom faces, said bottom face being adapted to be positioned in operating relation to said surface, a magnetic transducer carried in said bottom face and flush therewith, a high pressure manifold defined in said body, a low pressure manifold defined in said body, a first plurality of spaced conduits communicated between said high pressure manifold and said bottom face, said first conduits being positioned radially about said transducer, a second plurality of spaced conduits communicated between said low pressure manifold and said bottom face, said second conduits being positioned radially about said transducer and concentric with said first conduits but closer to said transducer, a third plurality of conduits communicating between said top and bottom faces and positioned radially about said transducer concentric of said first and second conduits and intermediate therebetween, a high pressure line communicating with said high pressure manifold through said top face, a low pressure line communicating with said low pressure manifold through said top face, a high pressure source and a low pressure source, valve means connecting said sources to their associated lines and means to adjust said valves to vary the magnitude of said pressure to thereby vary the distance between said bottom face and said recording surface.

References Cited in the file of this patent

UNITED STATES PATENTS

| | | |
|---|---|---|
| 2,612,566 | Anderson | Sept. 30, 1952 |
| 2,710,234 | Hansen | June 7, 1955 |